(12) United States Patent
Forsberg et al.

(10) Patent No.: US 11,796,656 B2
(45) Date of Patent: Oct. 24, 2023

(54) SENSOR MOUNTING DEVICE, SENSOR ASSEMBLY AND VEHICLE

(71) Applicant: CPAC SYSTEMS AB, Gothenburg (SE)

(72) Inventors: Peter Forsberg, Gothenburg (SE); Oskar Noresson, Mölndal (SE)

(73) Assignee: CPAC SYSTEMS AB, Gothenburg (SE)

( * ) Notice: Subject to any disclaimer, the term of this patent is extended or adjusted under 35 U.S.C. 154(b) by 547 days.

(21) Appl. No.: 16/637,445

(22) PCT Filed: Aug. 30, 2017

(86) PCT No.: PCT/EP2017/071808
§ 371 (c)(1),
(2) Date: Feb. 7, 2020

(87) PCT Pub. No.: WO2019/042547
PCT Pub. Date: Mar. 7, 2019

(65) Prior Publication Data
US 2020/0249333 A1 Aug. 6, 2020

(51) Int. Cl.
*G01S 7/497* (2006.01)
*G01S 17/931* (2020.01)
(Continued)

(52) U.S. Cl.
CPC .............. *G01S 7/4972* (2013.01); *B60S 1/48* (2013.01); *B60S 1/54* (2013.01); *B60S 1/56* (2013.01); *G01S 7/4813* (2013.01); *G01S 17/931* (2020.01)

(58) Field of Classification Search
CPC .... G01S 7/4972; G01S 17/931; G01S 7/4813; B60S 1/48; B60S 1/54; B60S 1/56
(Continued)

(56) References Cited

U.S. PATENT DOCUMENTS 3,998,298 A * 12/1976 Fleagle ................... G01P 3/488
310/168
6,322,275 B1 * 11/2001 Schmidt .................. G01S 7/032
403/14
(Continued)

FOREIGN PATENT DOCUMENTS

CN     103043035 A     4/2013
CN     104802725 A     7/2015
(Continued)

OTHER PUBLICATIONS

International Search Report and Written Opinion in corresponding International Application No. PCT/EP2017/071808 dated Jul. 9, 2018 (12 pages).
(Continued)

*Primary Examiner* — Matthew David Kim
(74) *Attorney, Agent, or Firm* — Venable LLP; Jeffri A. Kaminski

(57) ABSTRACT

The disclosure relates to a sensor mounting device for mounting a sensor to an object The device comprises an object attachment member for attaching the sensor mounting device to the object, a sensor attachment member for attaching the sensor to the sensor mounting device, wherein the object attachment member and the sensor attachment member are located at a distance from each other in a longitudinal direction of the sensor mounting device. The object attachment member and the sensor attachment member are connected by at least two connecting elements, and the at least two connecting elements are adapted to adjust an inclination of the object attachment member relative to the sensor attachment member by adjusting the distance in the longitudinal direction between portions of the object attachment member and the sensor attachment member. Furthermore,
(Continued)

the present invention relates to a sensor assembly and a vehicle comprising a sensor mounting device.

20 Claims, 4 Drawing Sheets

(51) Int. Cl.
*B60S 1/48* (2006.01)
*B60S 1/54* (2006.01)
*B60S 1/56* (2006.01)
*G01S 7/481* (2006.01)

(58) Field of Classification Search
USPC .......................................................... 356/4.01
See application file for complete search history.

(56) References Cited

U.S. PATENT DOCUMENTS

| | | | | |
|---|---|---|---|---|
| 2004/0239574 | A1* | 12/2004 | Zeiher | G01S 7/02 343/757 |
| 2013/0092758 | A1 | 4/2013 | Tanaka et al. | |
| 2013/0199251 | A1* | 8/2013 | Taylor | E05B 73/0082 340/568.1 |
| 2015/0183406 | A1* | 7/2015 | Tanaka | B08B 3/02 134/99.1 |
| 2015/0353024 | A1* | 12/2015 | Cooper | B60R 11/04 348/148 |
| 2016/0061377 | A1* | 3/2016 | Nakatani | F16M 11/242 248/184.1 |
| 2016/0223652 | A1 | 8/2016 | Bosse et al. | |
| 2016/0244028 | A1 | 8/2016 | Wakatsuki | |
| 2017/0191291 | A1* | 7/2017 | Scholz | E05B 81/34 |
| 2017/0225782 | A1* | 8/2017 | Kohstall | B64C 1/063 |

FOREIGN PATENT DOCUMENTS

| | | |
|---|---|---|
| CN | 107076351 A | 8/2017 |
| DE | 10328089 A1 | 1/2005 |
| DE | 102014000987 A1 | 7/2014 |
| EP | 3141441 A1 | 3/2017 |
| GB | 1156072 A | 6/1969 |
| JP | 2008160508 A | 7/2008 |

OTHER PUBLICATIONS

International Preliminary Report on Patentability in corresponding International Application No. PCT/EP2017/071808 dated Aug. 12, 2019 (5 pages).
Chinese Office Action dated Jan. 13, 2023 in corresponding Chinese Patent Application No. 201780094250.8, 12 pages.

* cited by examiner 1,100

200

SENSOR MOUNTING DEVICE, SENSOR ASSEMBLY AND VEHICLE

CROSS-REFERENCE TO RELATED APPLICATIONS

This application is a U.S. National Stage application of PCT/EP2017/071808, filed Aug. 30, 2017 and published on Mar. 7, 2019 as WO 2019/042547, all of which is hereby incorporated by reference in its entirety.

TECHNICAL FIELD

The present invention relates to a sensor mounting device for mounting a sensor to an object. The present invention also relates to a sensor assembly comprising a sensor and to a vehicle comprising the sensor mounting device.

The invention can be applied in vehicles, such as trucks, buses and construction equipment. Although the invention mainly will be described with respect to a truck, the invention is not restricted to this particular vehicle, but may also be used in other vehicles such as wheel loaders, haulers, buses, construction equipment, passenger cars etc.

In addition, the invention is further not restricted only to vehicles, but can also be applied to other objects where there is a need for a robust sensor mounting device.

BACKGROUND

Mounting and integration of sensors to objects, in particular moving objects such as vehicles, is far from trivial. Many applications where sensors are used are exposed to vibrations, debris, impact etc. For example, one demanding application which comprises sensors is an autonomous vehicle—such as an autonomous truck—where it is of high importance that the sensors for the autonomous driving system of the vehicle function properly during use. An autonomous vehicle is a vehicle which can sense its environment and navigate without human input. Another example of an application where it is of high importance that sensors function properly during use is vehicles comprising driving aid systems, such as adaptive cruise control systems, lane keeping assist systems etc. For a sensor to function properly in these applications, it is important that the sensor is mounted correctly.

In addition, when converting vehicles for autonomous drive one major issue is the integration of the sensors to the vehicle. Commercially available sensor mounting devices do not offer the degree of debris and vibration protection needed, neither are they well suited for integration.

In view of the above, it is therefore a need for a robust and reliable sensor mounting device for attaching sensors to such objects.

One example of a sensor mounting device for a sensor can be found in the German patent application DE 10 2014 000 987 A1. It describes a mounting system for an opto-electronic instrument which mounting system comprises damping elements connected to a mass module. The damping elements are used to damp vibrations. However, the design does not provide the robustness and integration which is needed for more demanding applications.

SUMMARY

In view of the above described and other drawbacks of the prior art, an object of the present invention is to provide an improved sensor mounting device, which at least partly alleviates the drawbacks of the prior art. More particularly, an object of the present invention is to provide a robust sensor mounting device which also provides improved sensor integration to an object.

According to a first aspect, the object is achieved by a sensor mounting device for mounting a sensor to an object, which device comprises an object attachment member for attaching the sensor mounting device to the object and a sensor attachment member for attaching the sensor to the sensor mounting device. The object attachment member and the sensor attachment member are located at a distance from each other in a longitudinal direction of the sensor mounting device, wherein the object attachment member and the sensor attachment member are connected by at least two connecting elements, and wherein the at least two connecting elements are adapted to adjust an inclination of the object attachment member relative to the sensor attachment member by adjusting the distance in the longitudinal direction between portions of the object attachment member and the sensor attachment member.

By the provision of a sensor mounting device that comprises the above mentioned features, a robust sensor mounting device is provided which results in improved sensor integration to an object. Due to the function of the connecting elements between the object attachment member and the sensor attachment member, the sensor can be easily calibrated in relation to the object. More specifically, the object attachment member will function as an alignment/fine adjustment surface for the sensor position. Furthermore, the design allows for easy replacement of the sensor without altering the calibration. More specifically, the sensor can be easily removed from the object—for example for servicing the sensor—and then mounted back onto the object without altering the former geometric orientation of the sensor in relation to the object. This leads to a robust and cost efficient sensor mounting device. Further advantages and advantageous features of the invention are disclosed in the following description and in the dependent claims.

Optionally, each respective connecting element is adapted to maintain a fixed distance between the object attachment member and the sensor attachment member at the location of each respective connecting element. Thereby the sensor will maintain a fixed orientation in relation to the object during use.

Optionally, there is a gap of at least 10 mm between the object attachment member and the sensor attachment member.

Optionally, the at least two connecting elements are substantially longitudinally extending elements extending in the longitudinal direction of the sensor mounting device.

Optionally, the object attachment member and the sensor attachment member are connected by at least three connecting elements. By the use of at least three connecting elements, a further improved adjustment between the object attachment member and the sensor attachment member may be provided. Furthermore, the robustness of the sensor mounting device may be improved by the use of at least three connecting elements.

Optionally, at least one of the connecting elements comprises an adjustment screw. By the use of adjustment screws, a distance, and consequently an inclination, can be easily altered between the object attachment member and the sensor attachment member. Hence, by rotating the adjustment screw, for example by manually engaging the screw by a screwdriver, a relative position between the two members will be easily adjusted.

Optionally, at least one connecting element is fixedly attached to said object attachment member in said longitudinal direction but adapted to pivot around at least one axis extending essentially perpendicular to said longitudinal direction. Due to this, the sensor mounting device will be easily adjustable for calibration in a plane being essentially perpendicular to the longitudinal direction since the capability to pivot may allow an inclination of the object attachment member relative to the sensor attachment member. For example, if the sensor mounting device is mounted onto a truck, it may be mounted such that its longitudinal extension essentially aligns to the vertical extension of the truck. The sensor mounting device may then be easily calibrated in an essentially horizontal plane of the truck, allowing for both roll and pitch adjustment in relation to the horizontal plane. Optionally, the pivoting around the at least one axis is performed by a joint. In a preferred embodiment, said joint is a ball joint. However, there are of course also other joints available for allowing the longitudinal element to pivot around said a least one axis, such as for example a knuckle joint or the like. Still optionally, at least one connecting element comprises a coil spring or a fixation spring. In yet a further embodiment, a coil/fixation spring is enclosing an adjustment screw or the like in the longitudinal extension. Thereby a more robust design may be provided which facilitates the calibration of the device, and further provides an increased stability between the object and sensor attachment member.

Optionally, at least one of the connecting elements comprises a first end on a side of the sensor attachment member facing away from the object attachment member, wherein the adjustment can be performed by engaging the first end. For example, the engagement may be made via a screw head of an adjustment screw or the like. This allows for easy calibration for the sensor which is mounted to the sensor mounting device. In addition, due to this design, the calibration may be performed easily from the outside of the sensor mounting device.

Optionally, the object attachment member presents a first opening in the longitudinal direction adapted for allowing at least a part of the sensor to extend through the first opening when mounted to the device. With said design it will be easy to position and also replace the sensor to the sensor mounting device. Still further, said design will lead to that it will be easier to use sensors of different lengths, leading to an increased flexibility.

Optionally, attachment points of the at least two connecting elements on the object attachment member are arranged in a circumference around the first opening, wherein said first opening has a centre point in a plane transversal to said longitudinal direction, and wherein an angle between lines extending from said centre point to two adjacent attachment points in said circumference is at least 60 degrees. This allows for an improved calibration. In a further embodiment, when there are at least three connecting elements, the attachment points of the at least three elements to the object attachment member are arranged in an essentially L-shaped or tripod configuration seen in a plane being essentially perpendicular to the longitudinal direction of the sensor mounting device. This allows for an easy and efficient calibration. Especially, when having three connecting elements, if adjusting a distance of one of the elements it will only adjust an inclination with respect to one axis being defined by a line intersecting the attachment points on the object attachment member of the two other connecting elements. For example, if the calibration is done with respect to an essentially horizontal plane, only a roll or pitch of said plane may be adjusted by adjusting one of the elements and not both roll and pitch. This leads to that it will be easier to calibrate the sensor with respect to the object.

Optionally, the sensor mounting device further comprises a cover extending in the longitudinal direction arranged to cover at least a part of the sensor. The cover may be used to protect the sensor from the external environment, i.e. protect the sensor from debris, direct impact etc.

Optionally, the sensor mounting device further comprises an insert holder which is releasably attached to the sensor attachment member, and wherein the insert holder further comprises attachment means for attaching the sensor to the insert holder. Still further, the insert holder may further comprise at least one damping element for the sensor being adapted for damping vibrations emanating from the object when in use, the damping element preferably being a rubber element. For example, the rubber element may be a rubber stud. The actual number of rubber elements and their respective elasticity can be adjusted for optimal performance for the sensor as required depending on e.g. mass and moment of inertia. By the use of an insert holder which is releasably attached to the sensor attachment member it allows the sensor to be easily lifted out from the sensor mounting device for e.g. maintenance and/or repair. In addition, when having damping elements mounted onto the insert holder, said damping elements can be advantageously adapted for the specific sensor. More specifically, if replacing the sensor to another sensor of different type, also another insert holder may be used for that other sensor, which holder may comprise other damping elements.

Optionally, the sensor mounting device may further comprise a cleaning device for cleaning the sensor with at least one cleaning fluid. Optionally, the cleaning device may be arranged to be located in an internal space of the sensor mounting device. In an embodiment, the cleaning device is located inside the optional cover of the sensor mounting device, leading to an improved sensor mounting device with additional functionality integrated into the device.

A second aspect of the present invention relates to a sensor mounting device for mounting a sensor to an object, which comprises an object attachment member for attaching the sensor mounting device to the object, wherein the sensor mounting device further comprises a cleaning device for cleaning the sensor with at least one cleaning fluid. By the provision of the sensor mounting device comprising such a cleaning device an improved and more robust sensor mounting device is provided. More specifically, it will lead to a more reliable sensing performance of the sensor since the sensor can be easily cleaned during use. Integration of a cleaning device provides an improved and cost efficient sensor mounting device, also minimizing the need of removing the sensor for e.g. cleaning purposes. Optionally, the cleaning device is at least partly integrated into the object attachment member.

Optionally, in the case when the sensor mounting device comprises a cleaning device, the cleaning device comprises at least one fluid channel formed in the object attachment member, wherein the at least one fluid channel comprises at least one fluid inlet for allowing the at least one cleaning fluid to enter the at least one fluid channel and at least one fluid outlet for allowing the at least one cleaning fluid to exit the at least one fluid channel in order to clean the sensor.

Optionally, in the case when the sensor mounting device comprises a cleaning device, the cleaning device further comprises at least one valve arranged to switch between an open and a closed state for the at least one cleaning fluid. In a further embodiment, the at least one valve is further arranged to alter between providing a cleaning liquid or a cleaning gas—such as air—to the sensor during cleaning. In yet a further embodiment, the at least one valve is a solenoid valve.

Optionally, in the case when the sensor mounting device comprises a cleaning device and a cover, the cleaning device is at least partly integrated inside the cover. Thereby a very robust sensor mounting device will be provided comprising an integrated cleaning system for the sensor. In a further embodiment, a sensor mounting device is provided which comprises the above mentioned calibration function and the integrated cleaning function.

Optionally, in the case when the sensor mounting device comprises a cleaning device and a cover, the at least one cleaning fluid exits a fluid channel which is located within the cover. Thereby an improved and more compact sensor mounting device with integrated sensor cleaning will be achieved.

A third aspect of the present invention relates to a sensor assembly which comprises the sensor mounting device according to any one of the embodiments of the first and second aspects of the invention, and further comprises a sensor. The advantages of the sensor assembly are largely analogous to the advantages described in relation to the first and second aspect of the invention. Furthermore, all the embodiments of the first and second aspects of the invention are applicable to the third aspect of the invention and vice versa. Optionally the sensor is an optical sensor, a laser sensor, a depth sensor, a camera, or any other type of similar sensitive sensor equipment. An advantage of the present invention is that it offers the possibility to use sensors with varying diameter and/or length, thus providing an increased flexibility.

A fourth aspect of the present invention relates to a vehicle which comprises at least one sensor mounting device according to any one of the embodiments of the first and second aspects of the invention or at least one sensor assembly according to the third aspect of the invention. The advantages of the vehicle are also largely analogous to the advantages described in relation to the first and second aspects of the invention. Furthermore, all the embodiments of the first, second and third aspects of the invention are applicable to the fourth aspect of the invention and vice versa.

BRIEF DESCRIPTION OF THE DRAWINGS

With reference to the appended drawings, below follows a more detailed description of embodiments of the invention cited as examples. Like reference characters refer to like elements throughout the description.

In the drawings.

DETAILED DESCRIPTION OF EXAMPLE EMBODIMENTS OF THE INVENTION

Figure 1:
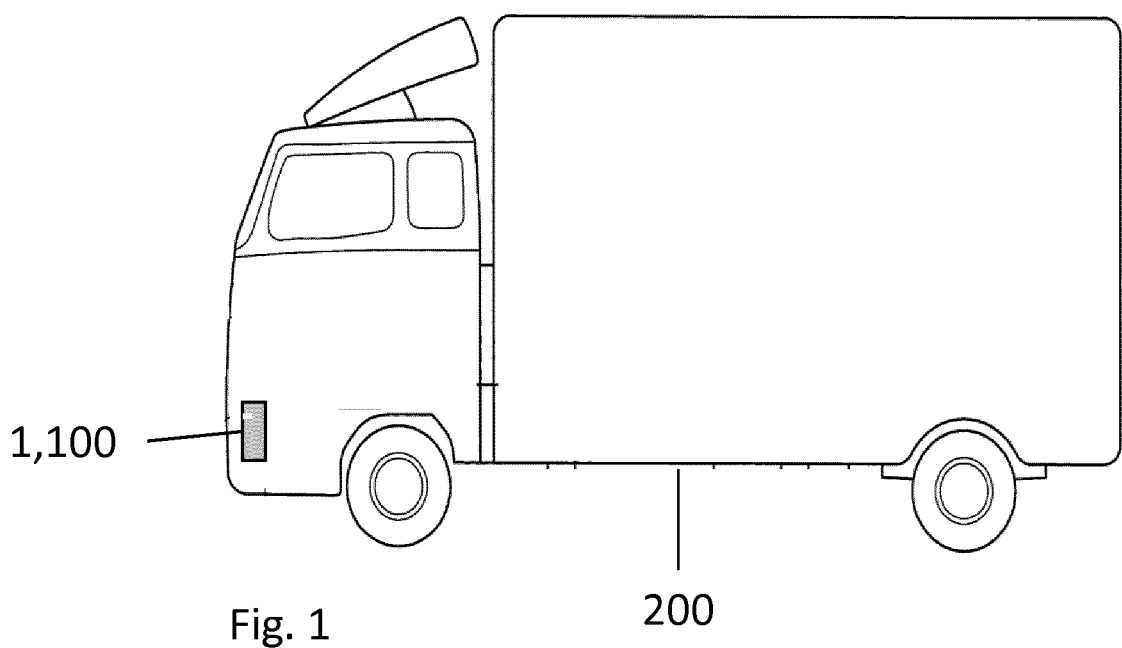
FIG. 1 is a view of an example embodiment of a vehicle comprising a sensor assembly according to the present invention.

In FIG. 1 a simplified view of a vehicle 200 can be seen comprising a sensor mounting device 1 and a sensor assembly 100 according to an example embodiment of the present invention. The vehicle 200 is in this example in the form of a truck. The sensor assembly 100 is mounted onto a front side of the truck 200. The sensor 2 can be easily removed and put back again without altering the calibration, i.e. assuring that the sensor 2 maintains a specific geometric orientation in relation to the truck 200. The truck 200 may be equipped with several sensor assemblies 100 located around the truck 200. The sensor may for example be an optical sensor, such as a laser sensor, that can e.g. detect a distance to another object, but it could likewise be any other type of sensor where it is of importance to maintain a specific geometric orientation to the object which the sensor 2 is attached to. In a further embodiment, the vehicle 200 equipped with the at least one sensor assembly 100 is an autonomous vehicle, wherein the at least one sensor mounting assembly 100 is part of an autonomous driving system of the vehicle 200. In yet a further embodiment, the at least one sensor assembly 100 is part of a driving aid system of the vehicle 200.

Figures 2A, 2B:
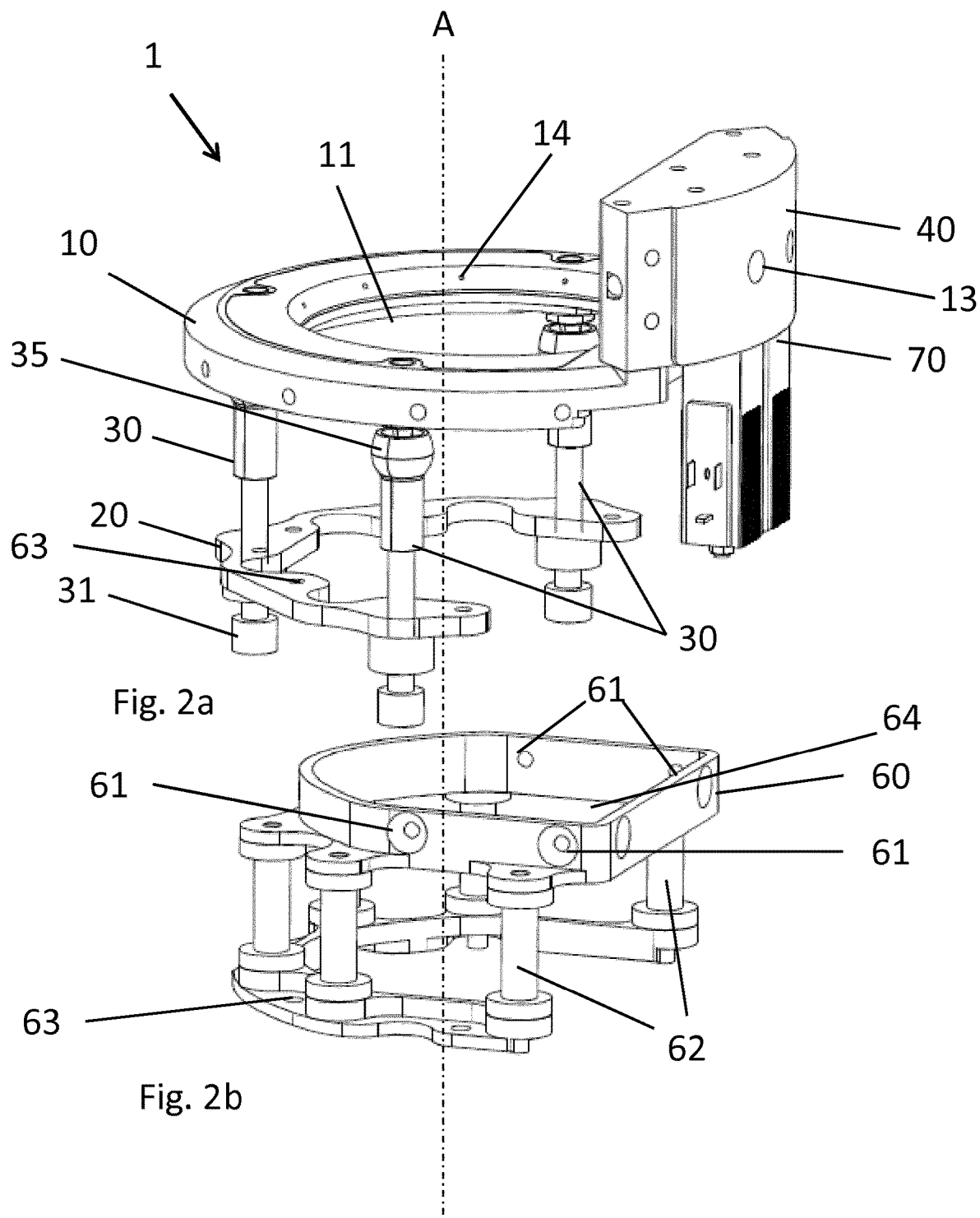
FIG. 2*a* is a perspective view of an example embodiment of a sensor mounting device according to the present invention.
FIG. 2*b* is a perspective view of an example embodiment of a sensor insert holder according to the present invention.

FIG. 2*a* shows a sensor mounting device 1 for mounting a sensor 2 (not shown in this figure) to an object according to an embodiment of the present invention. The sensor mounting device 1 comprises an object attachment member 10 for attaching the sensor mounting device 1 to the object and a sensor attachment member 20 for attaching the sensor 2 to the sensor mounting device 1. The sensor 2 may be directly or indirectly attached to the sensor attachment member 20 via screw holes 63. Furthermore, the sensor 2 is adapted to be located at least partly in an opening 11 of the object attachment member 10. The object attachment member 10 and the sensor attachment member 20 are located at a distance from each other in a longitudinal direction A, wherein the object attachment member 10 and the sensor attachment member 20 are connected by at least two connecting elements 30, and wherein the at least two connecting elements 30 are adapted to adjust an inclination of the object attachment member 10 relative to the sensor attachment member 20. In this specific embodiment, there are three connecting elements 30 arranged outside the circumference of the opening 11 of the object attachment 10. Furthermore, in this example, the connecting elements 30 are adjustment screws further presenting ball joints 35 in the proximity of the object attachment member 10. With this arrangement, a distance between the object attachment member 10 and the sensor attachment member can be adjusted by rotating at least one of the adjustment screws 30 via a first end 31 facing away from the object attachment member 10, which will lead to that an inclination of the object attachment member 10 relative the sensor attachment member 20 will be adjusted. Hence, a sensor 2 which is attached to the sensor attachment member 10 can be easily calibrated such that its inclination relative to the object attachment member 10 can be adjusted. Furthermore, in this example embodiment, the sensor mounting device 1 further comprises a cleaning device 40 adapted for cleaning the sensor 2. The cleaning device 40 comprises at least one fluid inlet 13 and at least one fluid outlet 14 for cleaning the sensor 2. Still further, the cleaning device 40 comprises at least one valve 70 arranged to control the fluid and/or to switch between different fluids, e.g. liquid or gas. In this example, the cleaning device is equipped with two solenoid valves 70 which are arranged to switch between cleaning liquid and air for cleaning the sensor 2.

FIG. 2b shows an insert holder 60 which is releasably attached to the sensor attachment member 20 as seen in FIG. 2a. The holder 60 can be attached to the sensor attachment member 20 via screw holes 63 on the members 60 and 20, respectively. Furthermore, the insert holder 60 comprises attachment means 61 for attaching the sensor 2 to the insert holder 60. In this example, the attachment means are threaded bores in which screws can be inserted for attaching the sensor. The insert holder 60 further comprises damping elements 62 for the sensor 2 which are adapted for damping vibrations emanating from the object when in use. The damping elements 62 are in this embodiment rubber studs which are arranged in a circumference of an opening 64 of the holder 60 into which the sensor 2 shall be placed.

Figure 3:
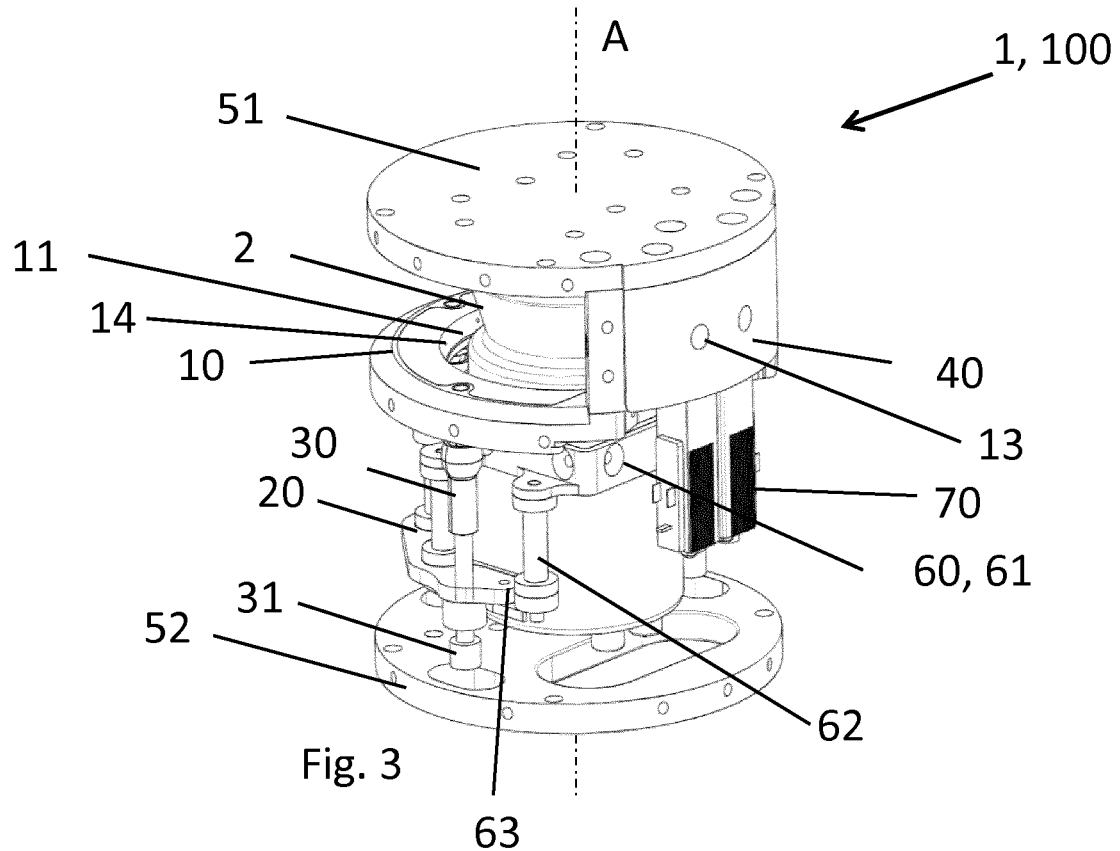
FIG. 3 is a perspective view of an example embodiment of a sensor assembly according to the present invention.

In FIG. 3 a sensor mounting device 1 and a sensor assembly 100 is shown. The sensor mounting device 1 comprises an object attachment member 10 for attaching the sensor mounting device 1 to an object and a sensor attachment member 20 for attaching the sensor 2 to the sensor mounting device 1. The sensor 2 is directly or indirectly attached to the sensor attachment member 20 by screws in screw holes 63. Furthermore, the sensor 2 is adapted to be located at least partly in an opening 11 of the object attachment member 10. A first and a second cover 51 and 52 on remote sides in the longitudinal direction A of the sensor assembly 100 is shown, which are used to protect the sensor from the external environment. The other parts as shown in FIG. 3 are the same as the ones already presented in relation to FIGS. 2a and 2b.

Figure 4:
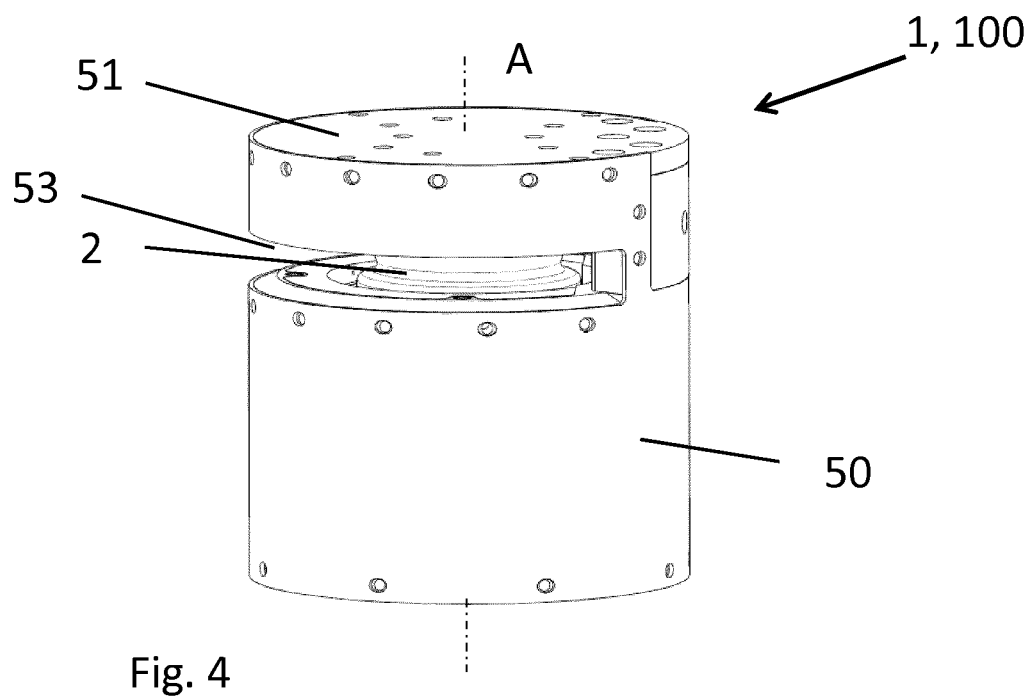
FIG. 4 is a perspective view of an example embodiment of a sensor assembly according to the present invention which comprises a cover.

In FIG. 4 a sensor mounting device 1 and a sensor assembly 100 according to an example embodiment is shown. In this embodiment, the sensor mounting device 1 and the sensor 2 is covered by a cylinder-shaped cover 50 and a circular-shaped cover 51 at a top surface of the sensor assembly 100. The cover 50 presents an opening 53 for allowing the sensor 2 to detect e.g. objects, events or changes in the surrounding environment. Optionally, the surfaces around the opening 53 are painted in a matt black colour and/or are grainy in order to improve the sensing performance, which is especially useful if an optical sensor is used.

Figure 5:
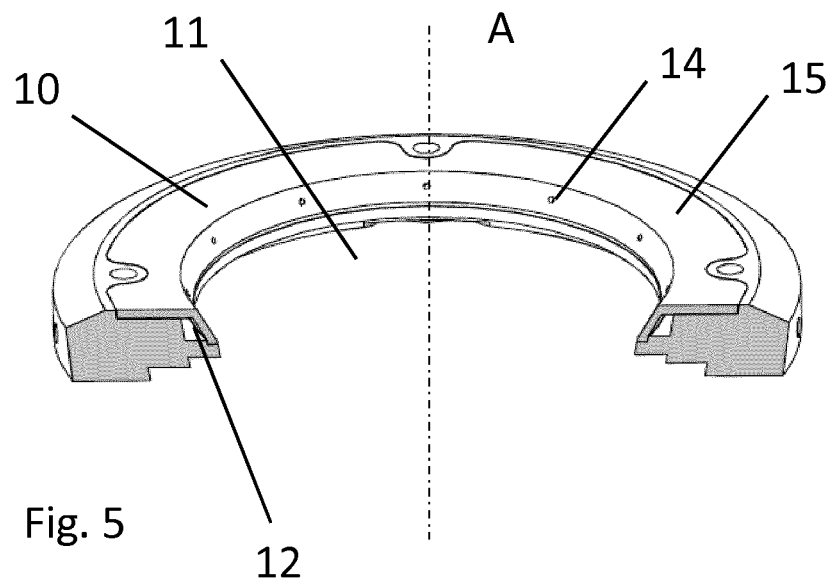
FIG. 5 is a perspective view of an example embodiment of an object attachment member according to the present invention comprising an integrated fluid channel.

In FIG. 5, a more detailed perspective view of an example embodiment of an object attachment member 10 is shown. The object attachment member 10 is extending in a circumferential direction around the longitudinal direction A of the sensor mounting device 1. In this example, a fluid channel 12, which is part of a cleaning system 40 of the sensor mounting device 1, is integrated into the object attachment member 10. The fluid channel also extends in the circumferential direction around the longitudinal direction A, and is further covered by a lid 15. The lid 15 may for example be attached to the object attachment member 10 by screws and/or glue. Furthermore, the lid 15 comprises at least one fluid outlet 14 arranged for allowing a fluid to exit the channel 12 for cleaning a sensor 2 (not shown). The fluid outlets 14 are arranged such that a fluid, when exiting the channel 12, will be directed towards a part of the sensor 2 comprising a sensor detection element, such as an optical detection element. A more compact, efficient and robust sensor assembly is achieved by integrating a cleaning device in this manner.

Figure 6:
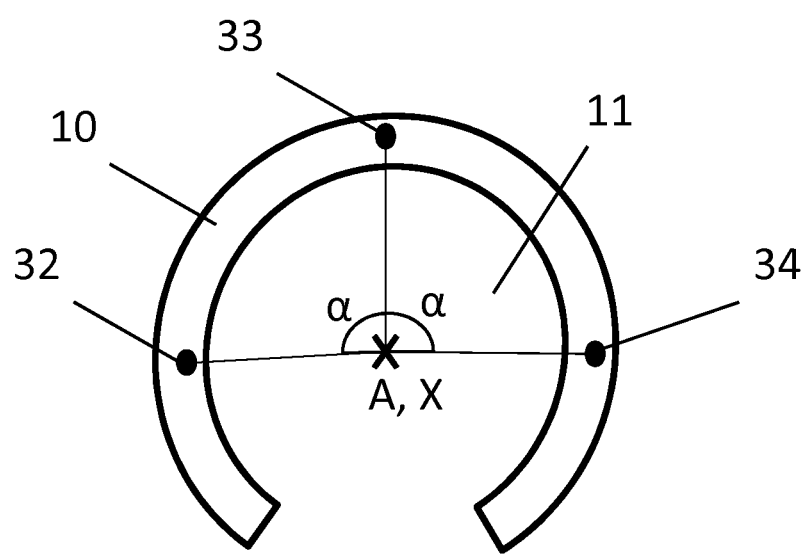
FIG. 6 is a cross-sectional view of an example embodiment of an object attachment member according to the present invention in the longitudinal direction.

In FIG. 6 a schematic view of an example embodiment of an object attachment member 10 according to the present invention is shown. The member 10 is seen in a plane being perpendicular to a longitudinal direction A of the sensor mounting device 1. Attachment points 32, 33 and 34 of three connecting elements 30 on the object attachment member 10 are arranged in a circumference around the opening 11. The opening 11 has a centre point X in a plane being transversal to said longitudinal direction A, and an angle α between lines extending from said centre point X of adjacent attachment points 32, 33 and 34 is at least 60 degrees, and in this particular embodiment about 90 degrees. The attachment points 32, 33 and 34 of the three elements are arranged in an essentially L-shaped or tripod configuration seen in the plane being essentially perpendicular to the longitudinal direction A of the sensor mounting device 1. This allows for an easy and efficient calibration. Especially, with this configuration, if adjusting one of the connecting elements it will only adjust an inclination with respect to one axis being defined by a line intersecting the attachment points of the two other connecting elements. For example, if the calibration is done with respect to the perpendicular plane, only a roll or pitch of said plane may be adjusted by adjusting one of the elements. This leads to that it will be easier to calibrate the sensor with respect to the object.

It is to be understood that the present invention is not limited to the embodiments described above and illustrated in the drawings; rather, the skilled person will recognize that many changes and modifications may be made within the scope of the appended claims.

The invention claimed is:

1. A sensor mounting device for mounting a sensor to an object, comprising,
    an object attachment member for attaching the sensor mounting device to the object,
    a sensor attachment member for attaching the sensor to the sensor mounting device,
    the object attachment member and the sensor attachment member are located at a distance from each other in a longitudinal direction of the sensor mounting device,
    wherein the object attachment member and the sensor attachment member are connected by at least two connecting elements, and
    wherein the at least two connecting elements are adapted to adjust an inclination of the object attachment member relative to the sensor attachment member by adjusting the distance in the longitudinal direction between portions of the object attachment member and the sensor attachment member,
    wherein, the sensor mounting de vice further comprises an insert holder which is releasably attached to the sensor attachment member so that the insert holder can be released from the sensor attachment member without removing the at least two connecting elements which connect the object attachment member to the sensor attachment member, wherein the insert holder further comprises attachment means for attaching the sensor to the insert holder, and
    wherein the object attachment member presents a first opening in the longitudinal direction adapted for allowing at least a part of the sensor to extend through the first opening when mounted to the device.

2. The sensor mounting device according to claim 1, wherein each respective connecting element is adapted to maintain a fixed distance between the object attachment member and the sensor attachment member at the location of each respective connecting element.

3. The sensor mounting device according to claim 1, wherein there is a gap of at least 10 mm between the object attachment member and the sensor attachment member.

4. The sensor mounting device according to claim 1, wherein the object attachment member and the sensor attachment member are connected by at least three connecting elements.

5. The sensor mounting device according to claim 1, wherein at least one of the connecting elements comprises an adjustment screw.

6. The sensor mounting device according to claim 1, wherein at least one connecting element is fixedly attached to said object attachment member in said longitudinal direction but adapted to pivot around at least one axis extending essentially perpendicular to said longitudinal direction.

7. The sensor mounting device according to claim 1, wherein at least one of the connecting elements comprises a first end on a side of the sensor attachment member facing away from the object attachment member, and wherein the adjustment can be performed by engaging the first end.

8. The sensor mounting device according to claim 1, wherein attachment points of the at least two connecting elements on the object attachment member are arranged in a circumference around the opening, said first opening having a centre point in a plane transversal to said longitudinal direction, and wherein an angle between lines extending from said centre point to two adjacent attachment points in said circumference is at least 60 degrees.

9. The sensor mounting device according to claim 1, further comprising a cover extending in the longitudinal direction and arranged to cover at least a part of the sensor.

10. The sensor mounting device according to claim 9, wherein a cleaning device is at least partly integrated inside the cover.

11. The sensor mounting device according to claim 10, wherein at least one cleaning fluid exits a fluid channel which is located within the cover.

12. The sensor mounting device according to claim 1, wherein the insert holder further comprises at least one damping element for the sensor being adapted for damping vibrations emanating from the object when in use.

13. The sensor mounting device according to claim 1, further comprising a cleaning device for cleaning the sensor with at least one cleaning fluid.

14. The sensor mounting device according to claim 13, wherein the cleaning device is at least partly integrated into the object attachment member.

15. The sensor mounting device according to claim 13, wherein the cleaning device comprises at least one fluid channel formed in the object attachment member, and wherein the at least one fluid channel comprises at least one fluid inlet for allowing the at least one cleaning fluid to enter the at least one fluid channel and at least one fluid outlet for allowing the at least one cleaning fluid to exit the at least one fluid channel in order to clean the sensor.

16. The sensor mounting device according to claim 13, wherein the cleaning device further comprises at least one valve arranged to switch between an open and a closed state for the at least one cleaning fluid.

17. The sensor mounting device according to claim 16, wherein the at least one valve is further arranged to alter between providing a cleaning liquid or a cleaning gas to the sensor during cleaning.

18. The sensor mounting device according to claim 16, wherein the at least one valve is a solenoid valve.

19. A sensor assembly, comprising, the sensor mounting device according to claim 1 and further comprising a sensor.

20. A vehicle comprising at least one sensor mounting device according to claim 1.

* * * * *